United States Patent
Yoshida (10) Patent No.: US 7,813,412 B2
(45) Date of Patent: Oct. 12, 2010

(54) RADIO BASE STATION APPARATUS, AND DESPREADING PROCESSING APPARATUS THEREFOR

(75) Inventor: Masaomi Yoshida, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 639 days.

(21) Appl. No.: 11/878,063

(22) Filed: Jul. 20, 2007

(65) Prior Publication Data

US 2008/0025374 A1 Jan. 31, 2008

(30) Foreign Application Priority Data

Jul. 28, 2006 (JP) .............................. 2006-205513

(51) Int. Cl.
*H04B 1/69* (2006.01)
(52) U.S. Cl. ...................... 375/130; 375/150; 375/141; 375/146; 375/147; 370/328; 370/331; 370/335; 370/329
(58) Field of Classification Search .................. 375/130, 375/150, 141, 146, 147; 370/328, 229, 331, 370/335, 329
See application file for complete search history.

(56) References Cited

U.S. PATENT DOCUMENTS 6,914,932 B1 * 7/2005 Miya et al. .................. 375/150

2005/0088987 A1 * 4/2005 Ryu ........................... 370/328
2007/0025422 A1 * 2/2007 Sugisawa et al. ............. 375/141
2008/0074999 A1 * 3/2008 Usuda et al. ................ 370/229

FOREIGN PATENT DOCUMENTS

JP 2005-130246 5/2005

* cited by examiner

*Primary Examiner*—Eva Y Puente
(74) *Attorney, Agent, or Firm*—Hanify & King, P.C.

(57) ABSTRACT

The radio base station apparatus includes a first despreading processing circuit for despreading a first control channel (DPCCH) signal; a second despreading processing circuit for despreading either a second control channel (HS-DPCCH) signal or a third control channel (E-DPCCH) signal; a third despreading processing circuit capable of despreading the first control channel signal, the second control channel signal and the third control channel signal; a first scrambling code generation circuit for supplying a common scrambling code to both the first despreading processing circuit and the second despreading processing circuit; and a second scrambling code generation circuit for supplying to the third despreading processing circuit a scrambling code which is different from the scrambling code generated in the first scrambling code generation circuit.

9 Claims, 7 Drawing Sheets

RADIO BASE STATION APPARATUS, AND DESPREADING PROCESSING APPARATUS THEREFOR

CROSS-REFERENCE TO RELATED APPLICATIONS

This application is based upon and claims the benefit of priority from the prior Japanese Patent Application No. 2006-205513, filed on Jul. 28, 2006, the entire contents of which are incorporated herein by reference.

BACKGROUND OF THE INVENTION

1. Field of the Invention

The present invention relates to a radio base station apparatus, and a despreading processing apparatus therefor, in a radio communication system adopting HSDPA (High Speed Downlink Packet Access) and HSUPA (High Speed Uplink Packet Access) systems.

2. Description of the Related Art

HSDPA (High Speed Downlink Packet Access) in UMTS (Universal Mobile Telecommunication System) is the specification for achieving higher speed data communication than in the third generation (3G) radio communication system such as W-CDMA, aiming at higher peak transmission speed in a downlink with a lower transmission delay. HSDPA has been standardized in "Release 5" specification, issued by the 3GPP (3rd Generation Partnership Project), a consortium for standardizing the 3G system specifications.

HSDPA has the following features: (1). Use of a single physical channel shared by a plurality of mobile units (user equipment: UE) in time division; (2) automatic selection of a higher speed modulation and coding scheme depending on radio wave conditions; (3) adoption of a hybrid ARQ in which retransmission request (ARQ) is combined with correction coding processing; and so on.

In contrast, HSUPA (High Speed Uplink Packet Access) is the specification for achieving higher data communication speed in the uplink of W-CDMA, which complements HSDPA for higher communication speed in the downlink. HSUPA has been standardized in "Release 6" specification issued by the 3GPP (3rd Generation Partnership Project), a consortium for standardizing the 3G system specifications.

According to the "Release 6" by the 3GPP, as shown in Table 1 listed below, the control channels required for processing HSDPA are DPCCH (Dedicated Physical Control Channel) and HS-DPCCH (High-Speed Dedicated Physical Control Channel), while the control channels required for processing HSUPA are DPCCH and E-DPCCH (Enhanced Dedicated Physical Control Channel). Further, the control channels required for processing both HSDPA and HSUPA are DPCCH, HS-DPCCH and E-DPCCH.

TABLE 1

|  | HSDPA | HSUPA | HSDPA and HSUPA |
|---|---|---|---|
| Required Control Channels | DPCCH + HS-DPCCH | DPCCH + E-DPCCH | DPCCH + HS-DPCCH + E-DPCCH |

Figure 1:
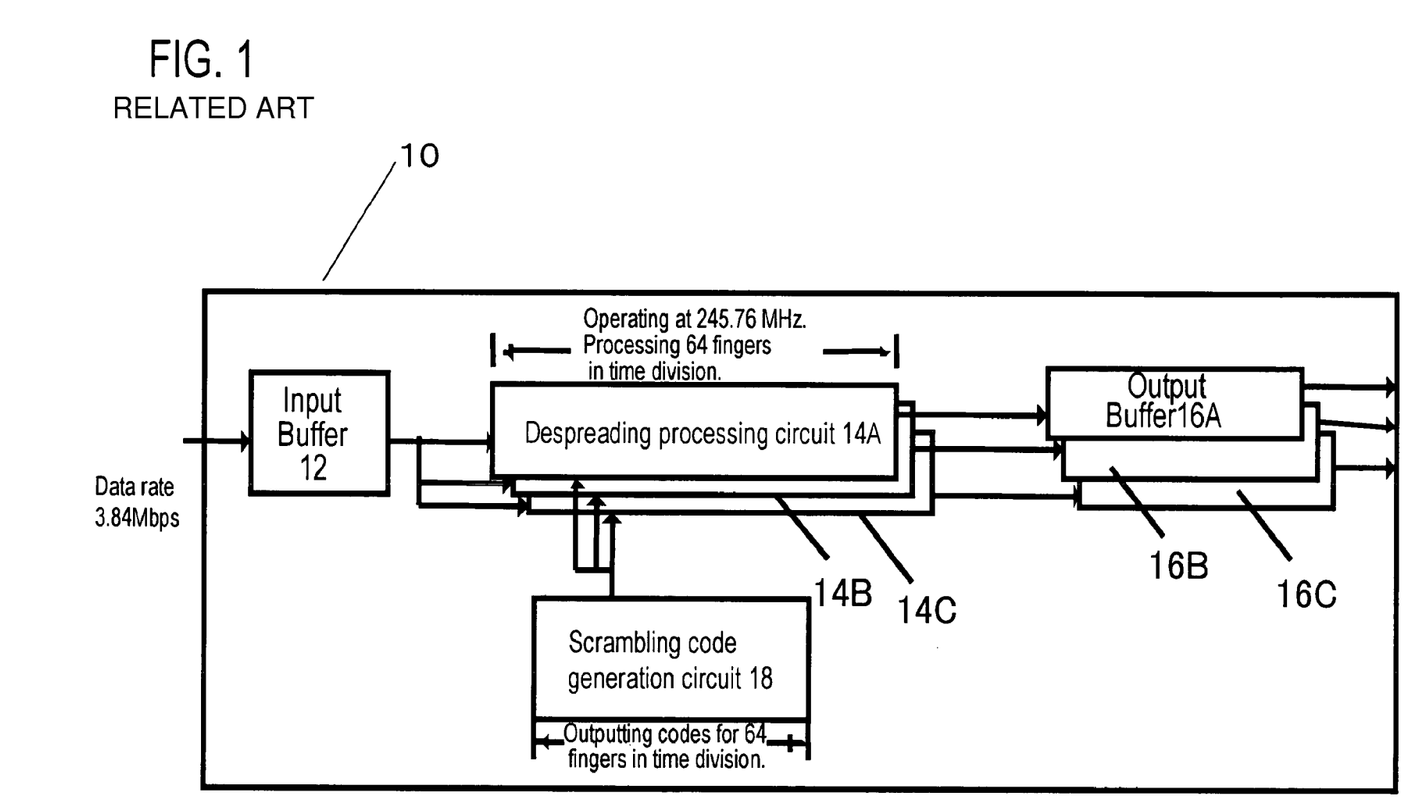
FIG. 1 shows a diagram illustrating the configuration of the conventional despreading processing unit for control channels in a radio base station apparatus.

FIG. 1 shows a diagram illustrating a configuration of a conventional despreading processing unit of a control channel in a radio base station apparatus. In W-CDMA, a series of transmission information data is transmitted after being spread into wideband signals by means of a spreading code of higher rate, as compared to the symbol rate of information data. On the receiving side, by performing correlation detection using the spreading code which is identical to the spreading code used for spreading on the transmission side (the process concerned is referred to as despreading), the series of the transmission information data is regenerated. A proper spreading code is assigned to each UE, and each UE is identified by the above spreading code. Such the spreading code is constituted of the combination of two code types: a Channelization Code for identifying a physical channel, and a Scrambling Code for identifying each UE.

In FIG. 1, a despreading processing unit 10 in the radio base station apparatus includes a plurality (in FIG. 1, three) of despreading processing circuits 14A, 14B and 14C, and reception data are supplied from an input buffer 12 to each despreading processing circuit 14A, 14B, 14C. The signal being despread in each despreading processing circuit 14A, 14B, 14C is temporally stored in each of a plurality of output buffers 16A, 16B and 16C, which are provided corresponding to despreading processing circuits 14A, 14B and 14C, respectively, and then output therefrom. A scrambling code generation circuit 18 supplies a common scrambling code to each despreading processing circuit 14A, 14B, 14C, as will be described later.

In case of a 3.84 Mbps chip rate, for example, by operating each despreading processing circuit 14 at 3.84 Mbps× 64=245.76 MHz, 64 resources can be processed in time division. Here, the number of resources is a unit of processing in each despreading processing circuit, which equals the number of channels taking finger into consideration. The finger is the number of paths to be synthesized at the time of RAKE reception, in which a plurality of paths are synthesized after timing and phases of the signals are adjusted for each path in a multipath environment. In case of three fingers for one channel, the number of resources becomes three, while in case of one finger for one channel, the number of resources becomes one.

The sum of the resources processed in each despreading processing circuit 14A, 14B, 14C becomes the number of processable resources N that can be processed in the overall despreading processing unit 10. In the example shown in FIG. 1, the number of processable resources N is 64×3=192.

Figure 2:
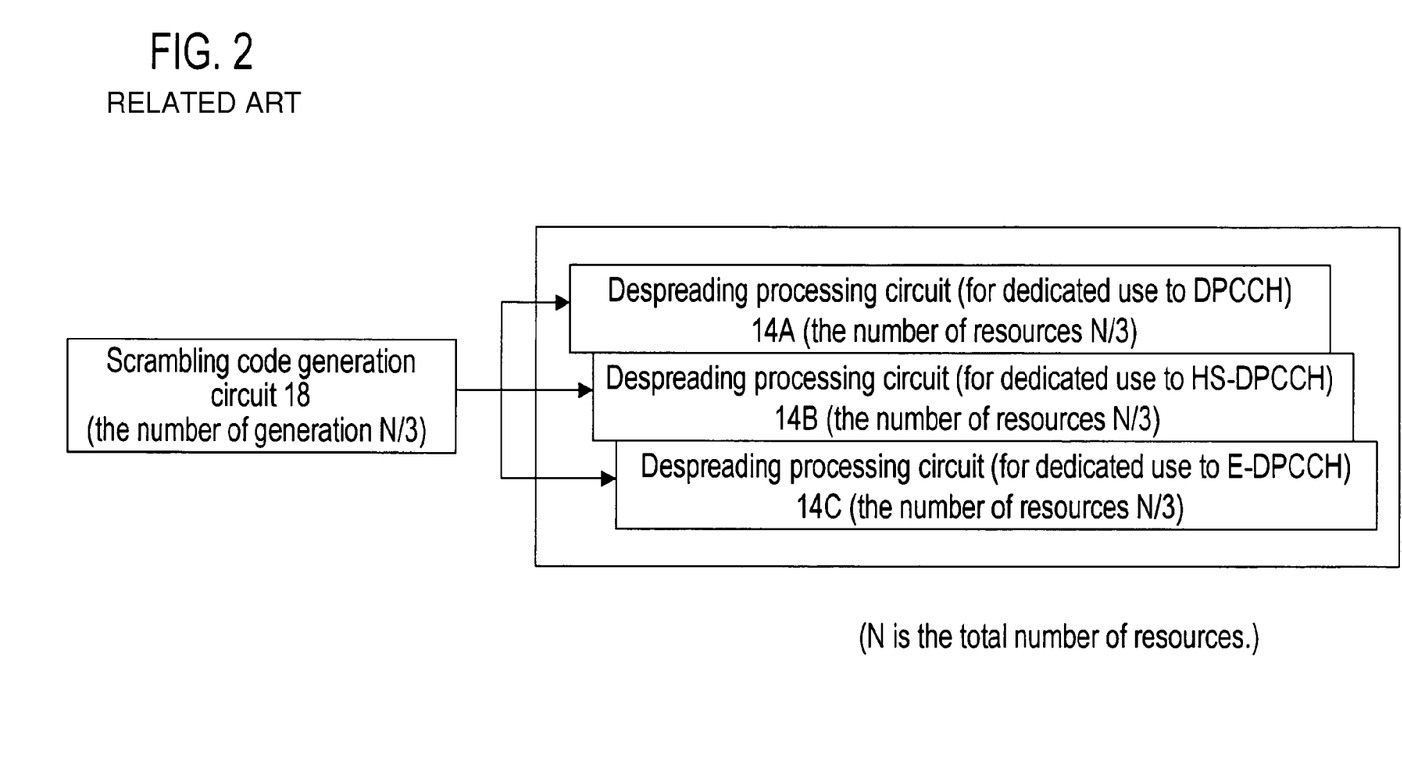
FIG. 2 shows a diagram illustrating channel assignment in the conventional despreading processing circuit.

FIG. 2 shows channel assignment in the conventional despreading processing circuits. Each despreading processing circuit 14A, 14B, 14C is provided for each control channel type. As shown in the figure, despreading processing circuit 14A is for dedicated use to DPCCH, despreading processing circuit 14B is for dedicated use to HS-DPCCH, and despreading processing circuit 14C is for dedicated use to E-DPCCH.

By supplying, to despreading processing circuit 14A, only a channelization code (which is actually supplied after being multiplexed with a scrambling code) corresponding to DPCCH, it becomes possible to use despreading processing circuit 14A as a dedicated circuit to the DPCCH processing. Similarly, by supplying only a channelization code corresponding to HS-DPCCH to despreading processing circuit 14B, and by supplying only a channelization code corresponding to E-DPCCH to despreading processing circuit 14C, it becomes possible to use despreading processing circuits 14B, 14C as a dedicated circuit to the HS-DPCCH processing, and a dedicated circuit to the E-DPCCH processing, respectively.

Further, when the number of processable resources in despreading processing unit 10 is N, the N resources are assigned to be equal to despreading processing circuits 14A, 14B, 14C provided for each control channel, and thus, each number of resources becomes N/3.

When processing HSDPA, both DPCCH despreading processing circuit 14A and HS-DPCCH despreading processing circuit 14B are used. At this time, because a proper scrambling code is given to one UE, both DPCCH despreading processing circuit 14A and HS-DPCCH despreading processing circuit 14B use a common scrambling code for one mobile unit UE (or user).

Also, when processing HSUPA, both DPCCH despreading processing circuit 14A and E-DPCCH despreading processing circuit 14C are used. As described above, because a single scrambling code is given to a single UE, both DPCCH despreading processing circuit 14A and E-DPCCH despreading processing circuit 14C use a common scrambling code for one mobile unit UE (or user).

Further, when processing both HSDPA and HSUPA, the entire DPCCH despreading processing circuit 14A, HS-DPCCH processing circuit 14B and E-DPCCH processing circuit 14C are used. Then, the entire DPCCH despreading processing circuit 14A, HS-DPCCH despreading processing circuit 14B and E-DPCCH despreading processing circuit 14C use a common scrambling code for one mobile unit UE (or user).

Namely, for each despreading processing circuit 14A, 14B, 14C, which processes N/3 resources in number, it is sufficient if one scrambling code generation circuit 18 is provided for generating N/3 common scrambling codes. Accordingly, as exemplarily shown in FIG. 1, scrambling code generation circuit 18 outputs, in time division, scrambling codes having the identical number to the number of resources (N/3=64), in synchronization with the processing in each despreading processing circuit 14.

Although a channelization code generation circuit is omitted in the figure, actually, a channelization code is supplied to each despreading processing circuit after being multiplexed with the scrambling code. Each channelization code generation circuit is provided for each control channel type.

In the official gazette of the Japanese Unexamined Patent Publication No. 2005-130,246 (Patent document 1), there has been disclosed a radio receiver unit in which path tables for finger assignment in RAKE synthesis are set separately to fit to each channel characteristic, and the finger is assigned independently of each channel, thereby performing RAKE synthesis to demodulate a received radio signal.

In the above configuration shown in FIG. 1, when processing both HSDPA and HSUPA, the entire despreading processing circuits 14A, 14B, 14C are used. However, when processing HSDPA, E-DPCCH despreading processing circuit 14C is unused, and also, when processing HSUPA, HS-DPCCH despreading processing circuit 14B is unused. Therefore, the processing capacity corresponding to the number of resources processable in an unused despreading processing circuit becomes wasteful, and the use efficiency of the despreading processing circuit is degraded.

SUMMARY OF THE INVENTION

Accordingly, it is an object of the present invention to provide a radio base station apparatus that performs despreading processing by efficiently using despreading processing circuits even when processing either HSDPA or HSUPA, and a despreading processing apparatus for the same.

As a first configuration of a radio base station apparatus according to the present invention to achieve the aforementioned object, in the radio base station apparatus despreading and demodulating a reception signal, there are provided a first despreading processing circuit for despreading a first control channel signal; a second despreading processing circuit for despreading either a second control channel signal or a third control channel signal; a third despreading processing circuit capable of despreading the first control channel signal, the second control channel signal and the third control channel signal; a first scrambling code generation circuit for supplying a common scrambling code to the first despreading processing circuit and the second despreading processing circuit; and a second scrambling code generation circuit for supplying to the third despreading processing circuit a scrambling code which is different from the scrambling code generated in the first scrambling code generation circuit.

As a second configuration of the radio base station apparatus according to the present invention, in the above first configuration, when receiving the first channel signal and the second channel signal, the second despreading processing circuit despreads the second control channel signal, and the third despreading processing circuit despreads both the first control channel signal and the second control channel signal.

As a third configuration of the radio base station apparatus according to the present invention, in the above second configuration, the third despreading processing circuit processes both the first control channel signal and the second control channel signal in time division, and while the first control channel signal is being processed in the third despreading processing circuit, a channelization code corresponding to the first control channel is supplied to the third despreading processing circuit, and while the second control channel signal is being processed, a channelization code corresponding to the second control channel is supplied to the third despreading processing circuit.

As a fourth configuration of the radio base station apparatus according to the present invention, in the above second configuration, when receiving the first control channel signal and the third control channel signal, the second despreading processing circuit despreads the third control channel signal, and the third despreading processing circuit despreads both the first control channel signal and the third control channel signal.

As a fifth configuration of the radio base station apparatus according to the present invention, in the above fourth configuration, the third despreading processing circuit processes both the first control channel signal and the third control channel signal in time division, and while the first control channel signal is being processed in the third despreading processing circuit, a channelization code corresponding to the first control channel is supplied to the third despreading processing circuit, and while the third control channel signal is being processed, a channelization code corresponding to the third control channel is supplied to the third despreading processing circuit.

As a sixth configuration of the radio base station apparatus according to the present invention, in the above fourth configuration, when receiving the first control channel signal, the second control channel signal and the third control channel signal, the second despreading processing circuit despreads the second control channel signal, and the third despreading processing circuit despreads the third control channel signal.

As a seventh configuration of the radio base station apparatus according to the present invention, in the above sixth configuration, the second scrambling code generation circuit supplies to the third despreading processing circuit a scrambling code which is identical to the scrambling code supplied from the first scrambling code generation circuit.

As an eighth configuration of the radio base station apparatus according to the present invention, in either one of the above first to the seventh configurations, the first control channel is DPCCH, the second control channel is HS-DPCCH, and the third control channel is E-DPCCH, and in case of HSDPA processing, the first control channel signal and the second control channel signal are received, and in case of HSUPA processing, the first control channel signal and the third control channel signal are received, and in case of processing both HSDPA and HSUPA, the first control channel signal, the second control channel signal and the third control channel signal are received.

According to the present invention, a despreading processing apparatus despreading a received radio signal includes: a first despreading processing circuit for despreading a first control channel signal; a second despreading processing circuit for despreading either a second control channel signal or a third control channel signal; a third-despreading processing circuit capable of despreading the first control channel signal, the second control channel signal and the third control channel signal; a first scrambling code generation circuit for supplying a common scrambling code to the first despreading processing circuit and the second despreading processing circuit; and a second scrambling code generation circuit for supplying to the third despreading processing circuit a scrambling code which is different from the scrambling code generated in the first scrambling code generation circuit.

Further scopes and features of the present invention will become more apparent by the following description of the embodiments with the accompanied drawings.

DETAILED DESCRIPTION OF THE PREFERRED EMBODIMENTS

The preferred embodiment of the present invention is described hereinafter referring to the charts and drawings. However, it is to be noted that the technical scope of the present invention is not limited to the embodiments described below.

Figure 3:
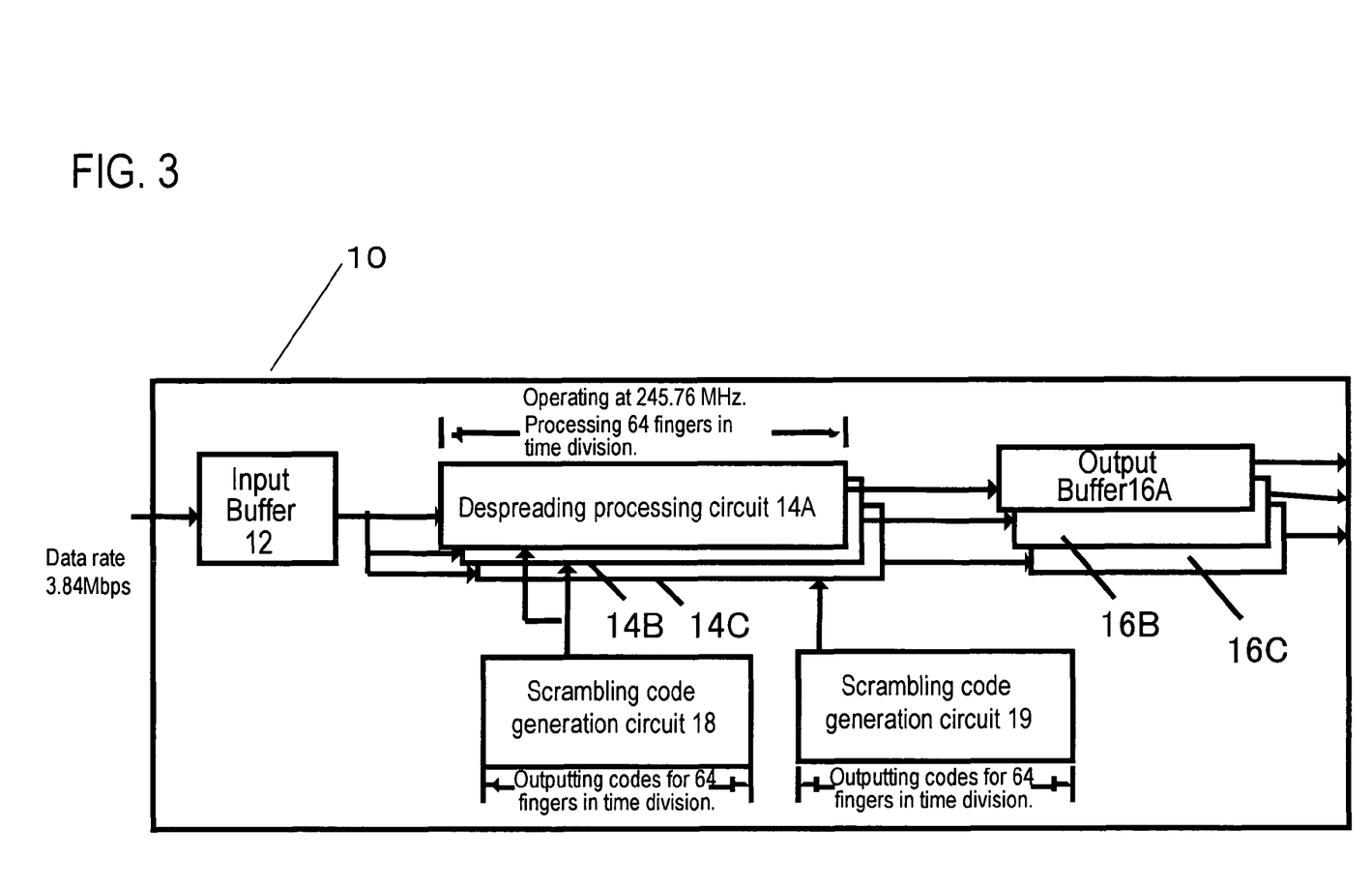
FIG. 3 shows a diagram illustrating the configuration of a despreading processing unit in a radio base station apparatus, according to an embodiment of the present invention.

FIG. 3 is a diagram illustrating the configuration of a despreading processing unit 10 in a radio base station apparatus according to an embodiment of the present invention. Similar to FIG. 1, despreading processing unit 10 in the radio base station apparatus includes a plurality (in FIG. 3, three) of despreading processing circuits 14A, 14B, 14C, and reception data are supplied from an input buffer 12 to each despreading processing circuit 14. Signals being despread in each despreading processing circuit 14 are temporarily stored in a plurality of output buffers 16, each corresponding to each despreading processing circuit 14, and then output therefrom.

As compared to FIG. 1, the characteristic configuration of the present invention is that a scrambling code generation circuit 18 supplies a common scrambling code to despreading processing circuits 14A, 14B, while another scrambling code generation circuit 19 supplies a scrambling code to despreading processing circuit 14C. As will be described later, the scrambling code supplied from the other scrambling code generation circuit 19 may be either identical to, or different from, the scrambling code supplied from scrambling code generation circuit 18, depending on the cases.

With the additional provision of the other scrambling code generation circuit 19 capable of outputting a scrambling code which is different from the scrambling code output from scrambling code generation circuit 18, it becomes possible to efficiently use despreading processing circuits even when HSDPA is processed exclusively, or HSUPA is processed exclusively.

Figure 4:
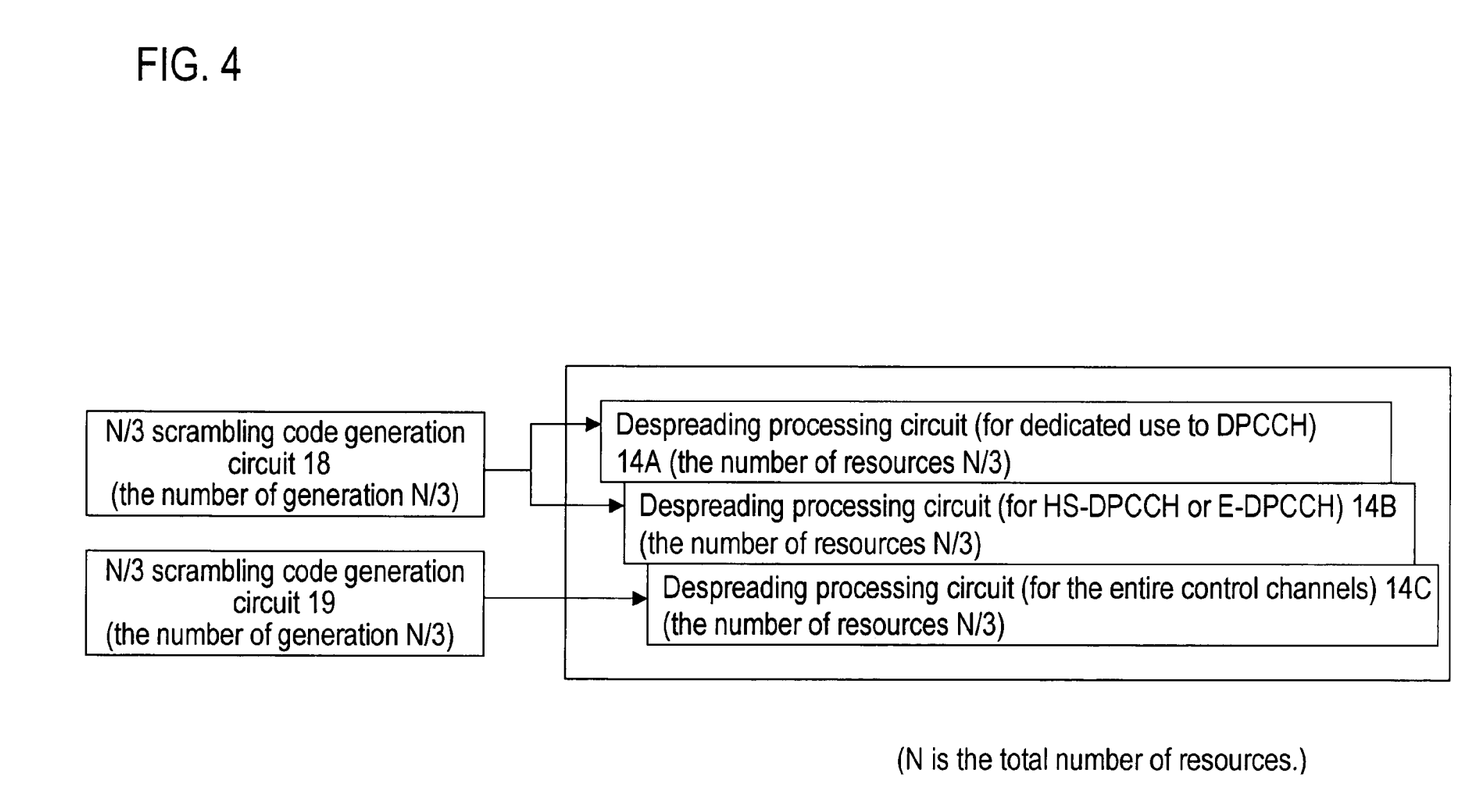
FIG. 4 shows a diagram illustrating channel assignment in the despreading processing circuit according to an embodiment of the present invention.

FIG. 4 shows a diagram illustrating channel assignment in the despreading processing circuit according to the embodiment of the present invention. In the present embodiment, despreading processing circuit 14A is for dedicated use to DPCCH processing, and despreading processing circuit 14B is used for processing either HS-DPCCH or E-DPCCH, and despreading processing circuit 14C is used for processing DPCCH, HS-DPCCH or E-DPCCH (in other words, for the entire channels).

To despreading processing circuit 14A, only a channelization code corresponding to DPCCH is supplied (which is actually supplied after being multiplexed with the scrambling code, as is also applied to the following cases). With this, it is possible to assign despreading processing circuit 14A dedicated to DPCCH processing.

To despreading processing circuit 14B, either a channelization code corresponding to HS-DPCCH or a channelization code corresponding to E-DPCCH is supplied. With this, it is possible to assign despreading processing circuit 14B to either HS-DPCCH processing or E-DPCCH processing.

To despreading processing circuit 14C, a channelization code corresponding to DPCCH, a channelization code corresponding to HS-DPCCH or a channelization code corresponding to E-DPCCH is supplied. With this, it is possible to assign despreading processing circuit 14C to any of the DPCCH processing, the HS-DPCCH processing and the E-DPCCH processing. In other words, despreading processing circuit 14C is applicable to the entire control channels.

Further, when the number of processable resources in despreading processing unit 10 is N, the resources are equally assigned to despreading processing circuits 14A, 14B, 14C for each control channel, and accordingly, each number of resources is N/3.

Figure 5:
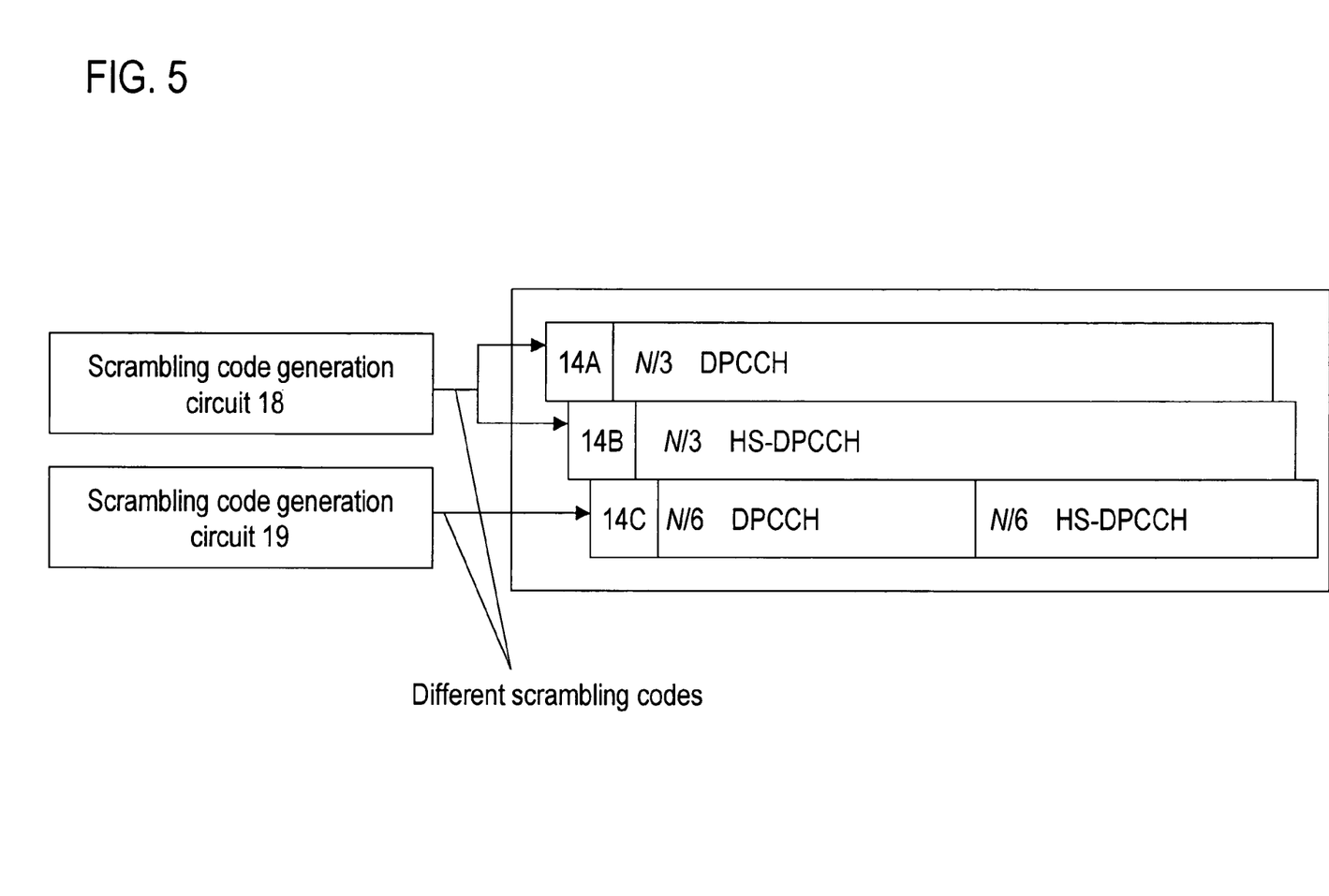
FIG. 5 shows a diagram illustrating control channel assignment when HSDPA is processed exclusively.

FIG. 5 shows a diagram illustrating control channel assignment when HSDPA is processed exclusively. When HSDPA is processed exclusively, the respective despreading processing circuits 14A, 14B and 14C are used in the following manner: despreading processing circuit 14A processes DPCCH, which is the control channel required for HSDPA, because despreading processing circuit 14A is provided for dedicated use to DPCCH; and despreading processing circuit 14B processes the other control channel, HS-DPCCH, which is required for processing HSDPA. At this time, to despreading processing circuits 14A and 14B, a common scrambling code is supplied from scrambling code generation circuit 18.

Meanwhile, despreading processing circuit 14C operates to process both DPCCH and HS-DPCCH. More specifically, among 64 (=N/3) resources to be processed in time division, 32 (=N/6) resources are used for the DPCCH processing, while the remaining 32 (=N/6) resources are used for the HS-DPCCH processing. Therefore, the channelization codes are switched over during processing 64 resources. At this time, a scrambling code is supplied from the other scrambling code generation circuit 19 to despreading processing circuit 14C. Here, the scrambling code supplied from the other scrambling code generation circuit 19 is different from the scrambling code supplied from scrambling code generation circuit 18. In other words, the other scrambling code generation circuit 19 is provided for generating the scrambling code which is different from the scrambling code generated in scrambling code generation circuit 18.

Conventionally, when HSDPA is processed exclusively, despreading processing circuit 14C is not used, causing a waste of resources. In contrast, according to the embodiment of the present invention, from the other scrambling code generation circuit 19 to despreading processing circuit 14C, there is supplied a scrambling code different from the scrambling code generated in scrambling code generation circuit 18. Using a spreading code based on the scrambling code supplied above, despreading processing circuit 14C operates to perform despreading processing on DPCCH and HS-DPCCH. As a result, the resources in despreading processing circuit 14C are efficiently used, and thus processing efficiency is improved.

Specifically, in the conventional HSDPA processing, the number of resources processed is N/3, using despreading processing circuits 14A and 14B. However, according to the embodiment of the present invention, despreading processing circuit 14C uses a half of N/3 resources for DPCCH, and the remaining half resources for HS-DPCCH. By this, N/6 resources are additionally used for the HSDPA processing. As a result, the maximum number of resources processed in the HSDPA processing is increased to N/2 in total, as shown in the following Table 2.

TABLE 2

|  | Conventional configuration | Configuration of the present invention |
|---|---|---|
| HSDPA | N/3 | N/2 |
| HSUPA | N/3 | N/2 |
| HSDPA and HSUPA | N/3 | N/3 |

Figure 6:
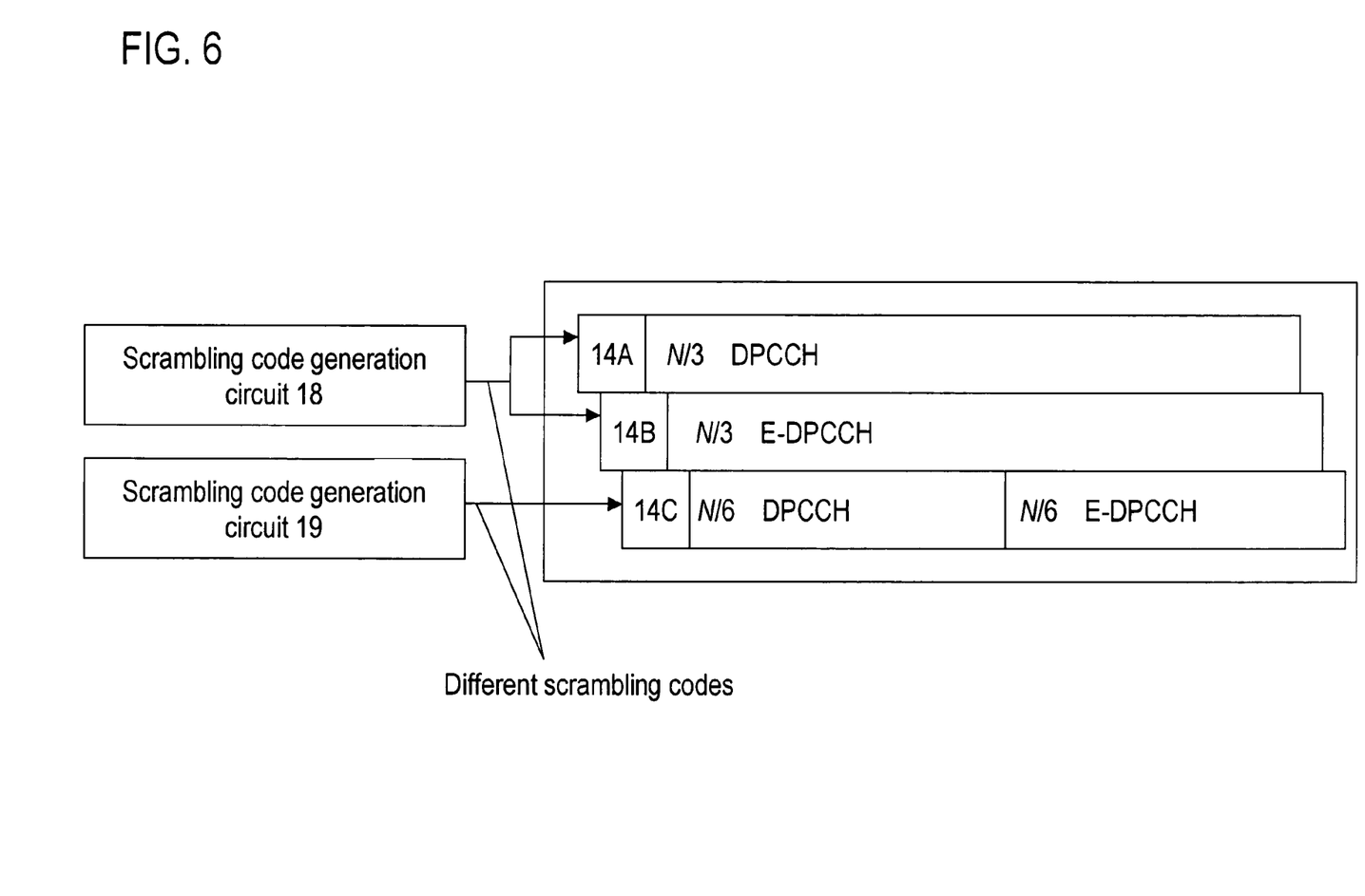
FIG. 6 shows a diagram illustrating control channel assignment when HSUPA is processed exclusively.

FIG. 6 shows a diagram illustrating control channel assignment when HSUPA is processed exclusively. In case that HSUPA is processed exclusively, if HS-DPCCH used at the time of the above HSDPA processing is replaced by E-DPCCH, the operation becomes substantially identical to the case of processing HSDPA exclusively. Namely, when HSUPA is processed exclusively, since despreading processing circuit 14A is provided for dedicated use to the DPCCH processing, despreading processing circuit 14A processes DPCCH i.e. the control channel required for HSUPA. Meanwhile, despreading processing circuit 14B processes the other control channel, E-DPCCH, required for HSUPA. At this time, the common scrambling code is supplied from scrambling code generation circuit 18 to both despreading processing circuits 14A and 14B.

Meanwhile, despreading processing circuit 14C operates to process both DPCCH and E-DPCCH. More specifically, among 64 (N/3) resources to be processed in time division, 32 (N/6) resources are used for the DPCCH processing, while the remaining 32 (N/6) resources are used for the HS-DPCCH processing. Therefore, the channelization codes are switched over during the processing of 64 resources. Further, at this time, a scrambling code is supplied from the other scrambling code generation circuit 19 to despreading processing circuit 14C.

Conventionally, when HSUPA is processed exclusively, despreading processing circuit 14B is not used, causing a waste of the number of resources thereof. In contrast, according to the embodiment of the present invention, despreading processing circuit 14B processes E-DPCCH, and from the other scrambling code generation circuit 19 to despreading processing circuit 14C, there is supplied a scrambling code different from the scrambling code supplied from scrambling code generation circuit 18. By use of a spreading code based on the scrambling code supplied above, despreading processing circuit 14C operates to perform despreading processing on DPCCH and E-DPCCH. As a result, the entire resources in the despreading processing circuit are efficiently used, and processing efficiency is improved.

Conventionally, the number of resources at the time of HSUPA processing is N/3 by means of despreading processing circuits 14A and 14C. According to the embodiment of the present invention, despreading processing circuit 14B uses a half of N/3 resources for E-DPCCH, and despreading processing circuit 14C uses a half of N/3 resources for DPCCH, and the remaining half resources for HS-DPCCH. By this, N/6 resources are additionally used for the HSUPA-processing, and accordingly, the maximum number of processing resources at the time of HSUPA processing is increased to N/2 in total, as shown in the above Table 2.

Figure 7:
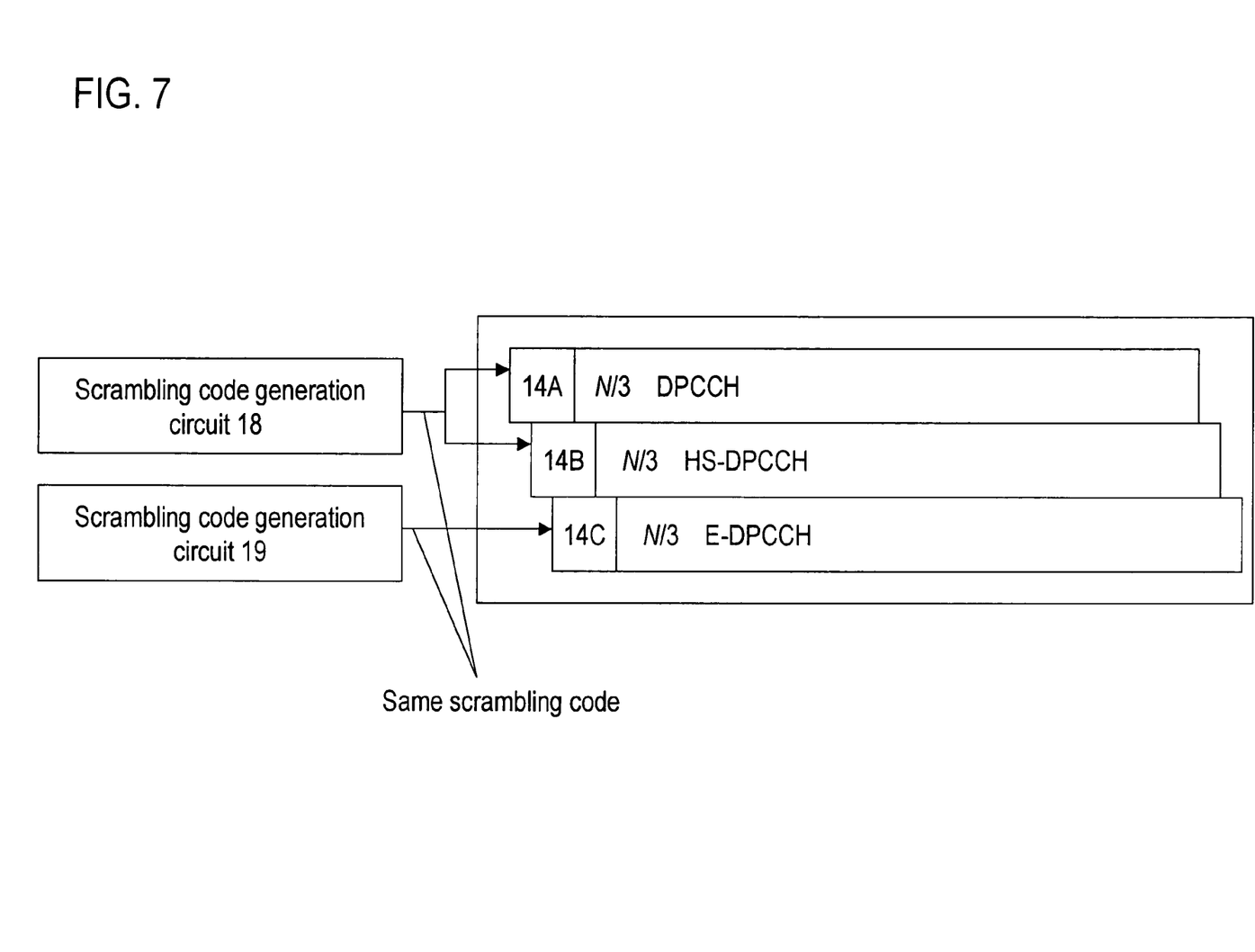
FIG. 7 shows a diagram illustrating control channel assignment when both HSDPA and HSUPA are processed.

FIG. 7 shows a diagram illustrating control channel assignment when both HSDPA and HSUPA are processed. When both HSDPA and HSUPA are processed, the conventional method is applied. Namely, despreading processing circuit 14B processes HS-DPCCH for HSUPA, and despreading processing circuit 14C processes E-DPCCH for HSUPA. The other scrambling code generation circuit 19 generates the identical scrambling code to the scrambling code generated in scrambling code generation circuit 18, so as to supply to despreading processing circuit 14C. In this case, the entire resources of the despreading processing circuits are used, and the maximum number of processing resources remains to be N/3, as shown in the above Table 2.

According to the embodiment of the present invention, there have been described despreading processing circuits for processing control channels used for HSDPA and HSUPA in W-CDMA, and a radio base station apparatus having the same. However, the present invention may also be applicable to circuits for processing different control channels and a radio base station apparatus in another communication system.

According to the present invention, by configuring to enable supply of the scrambling code from another scrambling code generation circuit to the third despreading processing circuit, it becomes possible to operate the entire despreading processing circuits for despreading processing of the control channels, and thus, the processing efficiency is improved.

In particular, the entire number of resources provided in the first to the third despreading processing circuits are used even when (1) receiving the signals of the first control channel (DPCCH) and the second control channel (HS-DPCCH), and not receiving the signals of the third control channel (E-DPCCH), or (2) receiving the signals of the first control channel (DPCCH) and the third control channel (E-DPCCH), and not receiving the signals of the second control channel (HS-DPCCH). As a result, the processing efficiency is improved.

The foregoing description of the embodiments is not intended to limit the invention to the particular details of the examples illustrated. Any suitable modification and equivalents may be resorted to the scope of the invention. All features and advantages of the invention which fall within the scope of the invention are covered by the appended claims.

What is claimed is:

1. A radio base station apparatus despreading and demodulating a reception signal, comprising:
   a first despreading processing circuit for despreading a first control channel signal;
   a second despreading processing circuit for despreading either a second control channel signal or a third control channel signal;
   a third despreading processing circuit for despreading the first control channel signal, the second control channel signal and the third control channel signal;
   a first scrambling code generation circuit for supplying a common scrambling code to the first despreading processing circuit and the second despreading processing circuit; and
   a second scrambling code generation circuit for supplying to the third despreading processing circuit a scrambling code which is different from the scrambling code generated in the first scrambling code generation circuit.

2. The radio base station apparatus according to claim 1, wherein, when receiving the first control channel signal and the second control channel signal, the second despreading processing circuit despreads the second control channel signal, and
   the third despreading processing circuit despreads both the first control channel signal and the second control channel signal.

3. The radio base station apparatus according to claim 2, wherein the third despreading processing circuit processes both the first control channel signal and the second control channel signal in time division, and while the first control channel signal is being processed in the third despreading processing circuit, a channelization code corresponding to the first control channel is supplied to the third despreading processing circuit, and while the second control channel signal is being processed, a channelization code corresponding to the second control channel is supplied to the third despreading processing circuit.

4. The radio base station apparatus according to claim 2, wherein, when receiving the first control channel signal and the third control channel signal, the second despreading processing circuit despreads the third control channel signal, and
   the third despreading processing circuit despreads both the first control channel signal and the third control channel signal.

5. The radio base station apparatus according to claim 4, wherein the third despreading processing circuit processes both the first control channel signal and the third control channel signal in time division, and while the first control channel signal is being processed in the third despreading processing circuit, a channelization code corresponding to the first control channel is supplied to the third despreading processing circuit, and while the third control channel signal is being processed, a channelization code corresponding to the third control channel is supplied to the third despreading processing circuit.

6. The radio base station apparatus according to claim 4, wherein, when receiving the first control channel signal, the second control channel signal and the third control channel signal, the second despreading processing circuit despreads the second control channel signal, and
   the third despreading processing circuit despreads the third control channel signal.

7. The radio base station apparatus according to claim 6, wherein the second scrambling code generation circuit supplies to the third despreading processing circuit a scrambling code which is identical to the scrambling code supplied from the first scrambling code generation circuit.

8. The radio base station apparatus according to claim 1, wherein the first control channel is DPCCH, the second control channel is HS-DPCCH, and the third control channel is E-DPCCH, and in case of HSDPA processing, the first control channel signal and the second control channel signal are received, and in case of HSUPA processing, the first control channel signal and the third control channel signal are received, and in case of processing both HSDPA and HSUPA, the first control channel signal, the second control channel signal and the third control channel signal are received.

9. A despreading processing apparatus despreading a received radio signal, comprising:
   a first despreading processing circuit for despreading a first control channel signal;
   a second despreading processing circuit for despreading either a second control channel signal or a third control channel signal;
   a third despreading processing circuit for despreading the first control channel signal, the second control channel signal and the third control channel signal;
   a first scrambling code generation circuit for supplying a common scrambling code to the first despreading processing circuit and the second despreading processing circuit; and
   a second scrambling code generation circuit for supplying to the third despreading processing circuit a scrambling code which is different from the scrambling code generated in the first scrambling code generation circuit.

* * * * *